United States Patent [19]

Young et al.

[11] Patent Number: 4,910,524

[45] Date of Patent: Mar. 20, 1990

[54] INVESTIGATING AND CONTROLLING THE POINTING DIRECTION OF AN ANTENNA ON BOARD A SPACECRAFT

[75] Inventors: Ronald W. Young, Knebworth; Simon J. Stirland, Hitchin, both of England

[73] Assignee: British Aerospace plc, London, England

[21] Appl. No.: 77,855

[22] Filed: Jul. 27, 1987

[30] Foreign Application Priority Data

Jul. 25, 1986 [GB] United Kingdom ............... 8618220

[51] Int. Cl.$^4$ ............................................. H04B 7/185
[52] U.S. Cl. ..................................... 342/354; 342/359
[58] Field of Search ............... 342/352, 354, 355, 358, 342/359, 360

[56] References Cited

U.S. PATENT DOCUMENTS

| | | | |
|---|---|---|---|
| 2,701,876 | 2/1955 | Mottley et al. | 342/360 |
| 3,341,151 | 9/1967 | Kampinsky | 342/360 |
| 3,534,364 | 10/1970 | Burford | 342/355 |
| 4,247,857 | 1/1981 | Wilcke et al. | 342/359 |
| 4,263,539 | 4/1981 | Barton | 342/359 |
| 4,315,262 | 2/1982 | Acampora et al. | 342/354 |
| 4,355,313 | 10/1982 | Hubert | 342/355 |
| 4,567,485 | 1/1986 | Oshima et al. | 342/358 |
| 4,599,619 | 7/1986 | Keigler et al. | 342/359 |
| 4,630,058 | 12/1986 | Brown | 342/359 |
| 4,684,955 | 8/1987 | Adams, Jr. et al. | 342/351 |
| 4,687,161 | 8/1987 | Plescia et al. | 342/355 |

Primary Examiner—Thomas H. Tarcza
Assistant Examiner—David Cain
Attorney, Agent, or Firm—Nixon & Vanderhye

[57] ABSTRACT

Measurement of flux density at the edges of the footprint of an RF transmission from a spacecraft with a view to determining the spacecraft antenna pointing error is difficult because of atmospheric fading local to the measuring station. Previous proposals to permit determination of pointing error in the face of such effects involve additional hardware on board the craft. Herein, it is proposed to induce a relatively small repetitive scanning motion of the spacecraft hence producing an oscillatory flux density variation at peripheral ground stations and then measuring the oscillatory component relative to the average flux density—frequency analysis equipment operable to discriminate the known frequency of the variation over a plurality of wavelengths can be used giving substantial accuracy improvement. A series of measurements enable the diurnal pointing error pattern to be determined and hence a spacecraft attitude correction command program to be produced.

11 Claims, 2 Drawing Sheets

INVESTIGATING AND CONTROLLING THE POINTING DIRECTION OF AN ANTENNA ON BOARD A SPACECRAFT

This invention relates to the investigation and control of the pointing direction of an antenna on board a spacecraft, more particularly but not exclusively a geosynchronous communications satellite, for example a broadcast satellite.

To optimise power use and avoid interference outside the required earth coverage area, a communications satellite may have an antenna system providing a spot beam or a superimposed combination of spot beams making up a shaped beam pattern closely contoured to the required coverage. Thus, accurate beam pointing becomes important. Geosynchronous satellites may be controlled to point one face of the satellite body at the Earth using Earth and Sun sensors but accurate attitude control of the satellite body does not necessarily guarantee accurate beam pointing. Particularly with large antenna systems, which are needed in order to give narrow beams, the antenna system can become misaligned relative to the attitude control sensor(s) due, for example, to pre-launch setting up inaccuracies, the shock and vibration of launch, the change from normal gravity on Earth to zero gravity in space, and cyclic temperature changes of the satellite with the daily variation in solar aspect.

Thus, the misalignment may comprise a fixed component and a component which follows a repetitive daily pattern, that pattern also changing but only relatively slowly, with the seasonal variation of the solar aspect.

To improve beam pointing accuracy, it has been proposed to add an R.F. sensor to the satellite antenna system to sense the direction of a ground beacon. There remains the problem of maintaining proper alignment of the R.F. sensor and antenna system but this is easier than maintaining alignment of the antenna system and attitude control sensor(s). However, a further problem is that additional hardware is needed on the satellite. Also, in some cases, the R.F. sensor may compromise best operation of the antenna system.

A further proposal involves determining the beam pointing error by simply measuring the flux density resulting from a satellite transmission at a number of ground stations sited around the beam pattern and then adjusting the satellite attitude so as to compensate for the error. In the face of noise and interference however it is difficult to make such measurement accurately and, because of the effect of atmospheric fading which is not constant for all the stations (it may even be local to only one station), this proposal would not be very effective in any case. The fading problem is discussed in Canadian Pat. No. 1197315 and the AIAA Paper No. 86-0613, "Optimum Antenna Beam Pointing For Communications Satellites" by Keigler and Muhlfelder. The two documents propose the same solution, namely the RCA 'BOSS' system in which the satellite transmits alternately through the primary antenna system and an auxiliary broad beam antenna system and the resulting flux density is measured at the ground stations. The flux density when the primary antenna is in use is more sensitive to pointing error than that resulting from the broad beam antenna transmission but both should be equally sensitive to fading.

Thus, the pointing error can be obtained from the relationship between the measurements. The satellite requires the auxiliary antenna as mentioned and also some form of switch for alternating the feed to the antenna.

An object of the present invention is to provide an alternative method and system for determining the beam pointing error which, in some cases, may be preferred to those described above. A further object is to provide such a method and system which does not necessitate additional satellite hardware.

According to one aspect of the invention, there is provided a method of determining the beam pointing direction of an antenna on board a spacecraft, in which method an R.F. radiation beam is transmitted to the ground from the antenna, the beam pointing direction is varied to produce a repetitive displacement of the beam ground pattern and a corresponding oscillatory variation of the flux density at an off-boresight ground station, and said oscillatory variation is measured at said ground station.

According to a second aspect of the invention, there is provided a system for determining the beam pointing direction of an antenna on-board a spacecraft, the system comprising:

control means for inducing a variation of the beam pointing direction to produce a repetitive displacement of the ground pattern of the antenna beam, and measuring means at an off-boresight ground station for measuring the resultant oscillatory variation of the flux density received at the ground station.

Preferably, said beam pointing direction is scanned through a range substantially smaller than the beam pointing direction tolerance which is permitted for the particular spacecraft, say through 30% of that permitted tolerance.

In order to determine the beam direction error which produces a displacement of the beam footprint in the North-South direction, the satellite and hence the beam can be made to execute an oscillatory turning movement about the roll axis of the satellite (i.e. the axis parallel to the direction of movement of the satellite around its orbit), and measurements of the resultant flux density change is made at an off-boresight ground station generally to the North or to the South of the beam centre on the ground.

Preferably, however, such measurements are made at two ground stations one to the North and one to the South—as mentioned later, it is then not even necessary to know the amplitude of the induced change in the beam pointing direction. Similarly, for error producing footprint displacement in the East-West direction, the satellite and beam can be oscillated with respect to the satellite pitch axis (parallel to the line through the North and South Poles), and flux changes measured at a position to the East or West of the beam centre but preferably at two positions respectively to the East and West. Very advantageously, the induced motion of the satellite and beam comprises a small amplitude coning motion, i.e. a movement comprising oscillation components about both the pitch and roll axes, so then the East-West and North-South errors can be determined at the same time.

Where the amplitude of the beam pointing direction scan is known, the pitch (or roll) error can be determined at a single site to the North or South (or East or West) of the beam centre by correlating the determined flux density change against the known form of the variation in flux density, gradient across the beam pattern.

However, as noted earlier, it is preferred that the error in each direction is obtained by determining the flux density change, for the same pointing direction change, at each of two sites generally located at opposite sides of the beam centre, i.e. to the North and South for roll error and to the East and West for pitch error, and then comparing the two determinations. It is then not necessary to know the amplitude of the pointing direction change.

For a better understanding of the invention reference will be made, by way of example, to the accompanying drawings, in which.

Figure 1:
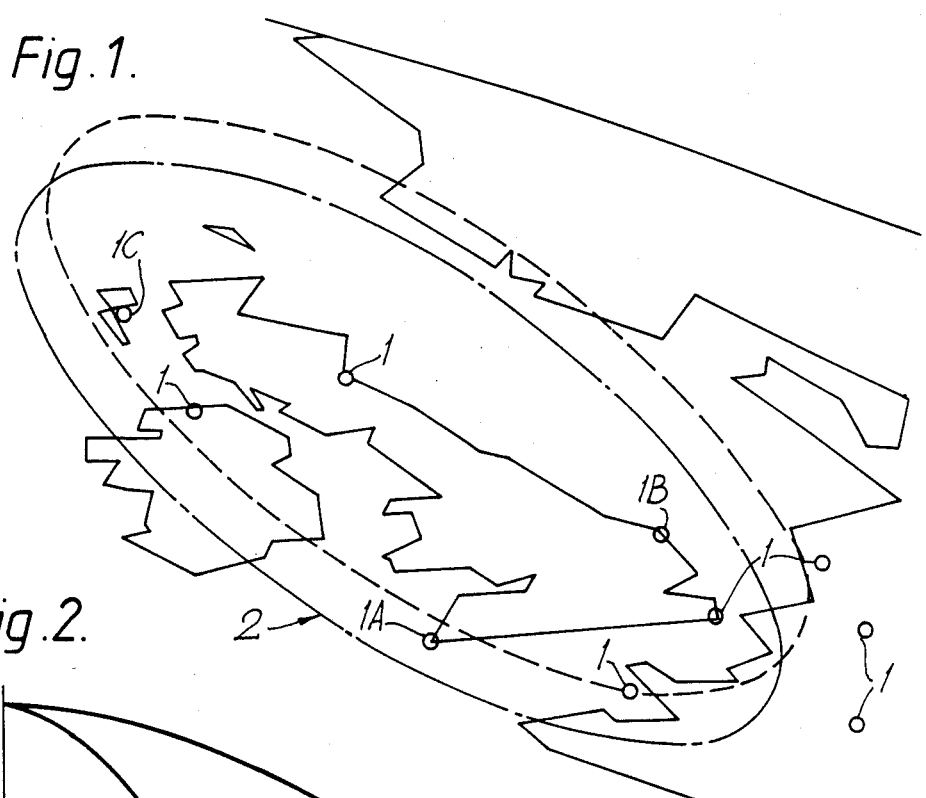
FIG. 1 is a diagrammatic view from a broadcast satellite, of the UK and adjacent areas and showing the elliptical transmission footprint of the satellite antenna.

FIG. 1 shows the sites 1, 1A, 1B and 1C of possible ground transmission flux measuring stations. When correctly pointed, the antenna system on the satellite (not shown) has a transmission footprint with a three dB contour 2 in the form of an ellipse shown in dash-dot outline. A 0.1° pointing error of the satellite antenna might move the contour 2 to the positions shown by the dashed outline missing part of Cornwall and producing interference in Norway.

Figure 2:
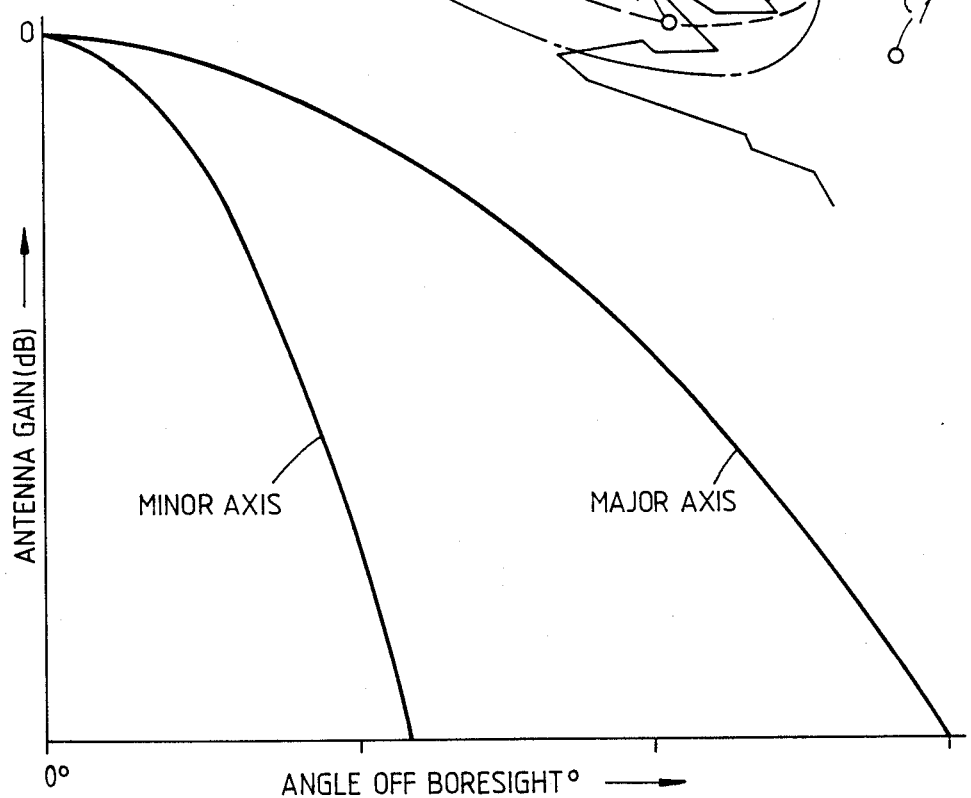
FIG. 2 is a plot showing the fall off in gain of the antenna of FIG. 1 with angle off boresight in the directions of the major and minor axes.
Figure 3:
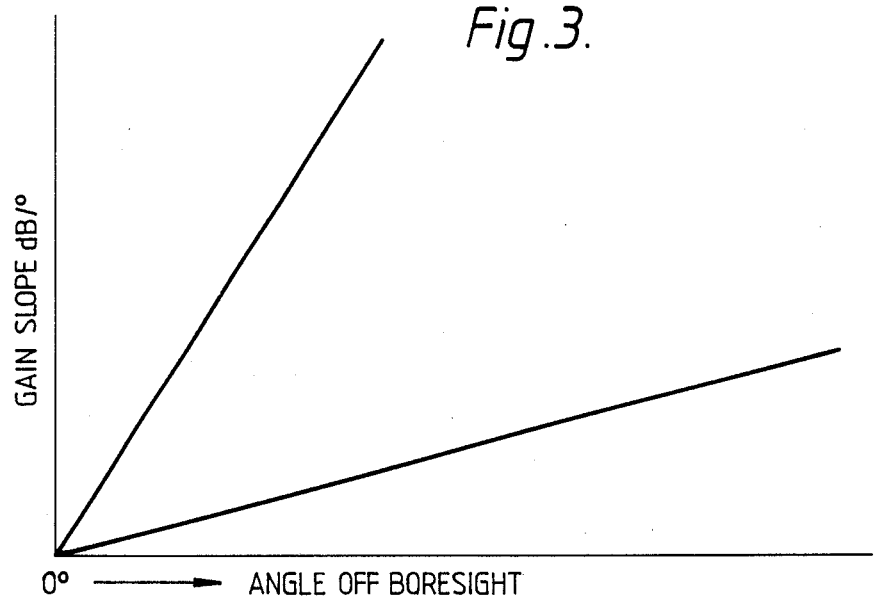
FIG. 3 is a plot of the gain slopes corresponding to FIG. 2.

As shown in FIG. 2, the antenna gain falls off with increasing angle off the antenna boresight. The plot shows also how, in the absence of atmospheric effects, the flux density would vary along the major and minor axes of the footprint. The slope of the fall off increases with angle off boresight as shown in FIG. 3. If a small coning movement of the antenna beam pointing direction is induced, say through 30% of the permitted pointing tolerance, the flux density at each off boresight ground station will contain a cyclicly varying amplitude component, the amplitude of the variation being determined by the gain slope value at the ground station.

The oscillatory amplitude variation is much easier to measure than the absolute value of flux since it will be independent of any d.c. drift and bias errors, and may be corrected for local atmospheric losses and ground station gain changes. Further, since the coning movement of the satellite R.F. beam can be well controlled, the frequency and phase of the ground flux oscillation can be known in advance. It is thus possible to use for the measurement phase-sensitive detection and filtering techniques which permit very accurate measurement over a period of time even in the face of noise and interference.

In some cases, the flux variation due to the coning movement of the satellite can be resolved by eye from a chart recorder trace forming part of standard flux density measuring equipment. This eye determination may be sufficient in itself or it may be backed up with an electronic measurement. Having measured the amplitude of the cyclic variation in flux, that measurement can be checked against what it should be given the known antenna gain/slope value at the ground station when the antenna is correctly pointed. From the value of any error, the required pointing direction correction can be calculated.

The amplitude of the flux variation due to the movement of the satellite pointing direction is of course dependent also upon atmospheric effects in the vicinity of the ground station at which the measurement is made and on the stability of the ground station equipment. However, the total flux density is also dependent upon these effects and so, by determining the amplitude of the flux variation relative to the total or absolute value of the flux, the atmospheric effect can be nullified.

The ability to check the flux variation amplitude or the relative amplitude against the known gain/slope variation and thereby determine pointing error assumes that the amplitude of the coning motion of the satellite is known. However, if the flux variation amplitude is measured at two ground stations, one generally displaced to the North and one to the South (for roll error) and/or one to the East and one to the West (for pitch error), of the pattern centre, then it becomes unnecessary to know the coning amplitude. Instead, the relative amplitude at the two stations can be determined and the respective pointing error derived from that.

Figure 4:
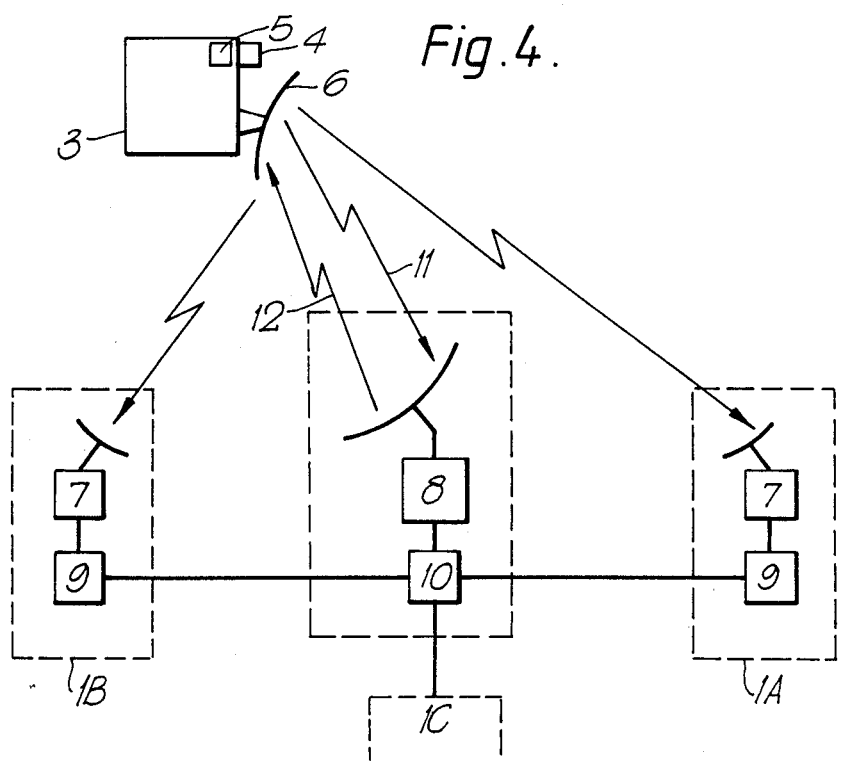
FIG. 4 is a block diagram of a pointing error correction system.

For each error direction, the two stations do not have to be exactly opposite one another with the beam centre between. Thus, as a minimum, both the pitch and roll errors can be obtained by measurements at only three stations provided these are appropriately located around the beam centre. FIG. 4 shows a possible implementation of a pointing error correcting system using the above described principles.

Referring to FIGS. 1 and 4 together, a satellite 3 is maintained nominally Earth pointing using signals from an infra-red Earth sensor (IRES) 4 and sun sensor 5.

The satellite antenna 6 transmits the signal with a 3 dB footprint 2. Misalignments between the IRES 4 and the boresight of the antenna 6 will cause small displacements of the footprint 2 from the desired position, such small displacements being predominantly constant or varying in a regular daily pattern which changes only slowly and in a regular manner with the seasons of the year.

Flux measuring stations 1 are situated within the beam, preferably close to the beam edge, which may be taken as anywhere between the 2 dB and 6 dB contours. For example, the stations designated 1A, 1B, 1C would suffice, although other combinations of three or more stations could be used.

Each flux measuring station has apparatus 7 to measure the received power F from the satellite. A highly accurate or stable measurement is not required, allowing the use of a simple low cost ground station or existing ground stations.

The satellite operations are controlled from a satellite operations control centre (SOCC) 8 which receives telemetry signals 11 from the satellite to monitor its status and sends command signals 12 to the satellite to control its operation.

The SOCC 8 has the capability to set up a small scanning motion of the satellite causing a similar motion of the satellite antenna 6 and hence of the footprint 2.

During measurement periods the SOCC 8 has telephone links to the flux measuring stations 1A, 1B, 1C and can send to these data on the frequency and phase of the satellite scanning motion.

The scanning motion will give rise to a variation $\Delta F$ in the measured flux level F at each measuring station, but this may well be masked or contaminated by other noise or variations in the level of F.

Each measuring station contains a measuring apparatus 9 e.g. a phase sensitive detector or a frequency response analyser (for example a Solartron 1250 series frequency response analyser) which when supplied with the frequency or frequency and phase of the scanning motion is able to pick out the component of ΔF at the scanning frequency with an improvement in signal/noise ratio depending upon the integration time. For example, using the above-mentioned Solartron analyser, the improvement might be 15–20 dB for one scan period, 30–35 dB for 10 scan periods, or 40–50 dB for 100 scan periods.

With a scanning period in the range 0.5 to 5 minutes an integration time of 1 hour allows more than 10 scan periods.

Each measuring station 1 may send to the SOCC 8 the average value of F and the average value of ΔF over 1 hour periods throughout the day.

Since both F and ΔF will be affected similarly by local atmospheric losses and gain changes at each station (unless the losses are cyclic and at the scan frequency) the ratio ΔF/F is insensitive to these losses.

The sets of data $F_A$ $\Delta F_A$, $F_B \Delta F_B$, $F_C \Delta F_C$ from the measuring stations are sent via telephone lines to the SOCC 8 and processed by a processor 10 to derive the average pointing direction of the satellite antenna over each measuring period.

The processing involves the correlation of the measured values of ΔF/F with those obtained from a knowledge of the beam shape and the positions of the measuring stations with respect to the beam centre.

The sets of data obtained throughout the day allow the evaluation of the pitch and roll pointing error profile throughout the day.

This may be used to generate a programme of pitch and roll biasses which can be used to offset the IRES to trim out the small antenna pointing errors.

With a zero momentum attitude control system such as that used on Olympus the pitch and roll offsets can be obtained through Reaction Wheel Control. With a fixed momentum wheel (FMW) attitude control system such as that used on the OTS satellite pitch correction is obtained via wheel speed control while roll control may be carried out by the use of solar sailing or magnetic torquing to precess the FMW, or a mechanism to trim the antenna or wheel axes.

With a single spot beam the described method and system does not allow a direct measurement of yaw error, but will apply pitch and roll corrections to give the best beam pointing accuracy in the presence of a yaw error.

For multiple spot beam systems, the scheme may be extended by the independent measurement of two (widely spaced) spot beams to include a direct yaw measurement.

The measurement accuracy achieved will depend upon the scanning period and the time over which the measurements are made, but to ensure that the daily pointing variations due to solar aspect are resolved a trade-off is made between extending the integration period over which any one measurement is made and shortening it so as to allow a larger number of measurements and hence a better indication of the form of the daily variation. As an example, measurement integration period may be limited to one hour.

A controlled satellite scanning motion of period in the range 0.5 to 5 minutes is readily obtained either by applying a suitable bias to the pitch and roll loops for a zero momentum spacecraft, such as Olympus, or by inducing a small nutation for a momentum bias spacecraft such as Eurostar. The active nutation damping scheme embodied on Eurostar for the tranquilisation period following station keeping manoeuvres can equally well be used to generate a small nutation, to give a scanning motion in roll. An independent pitch motion may be applied either separately or at the same time, i.e. so as to give a coning motion of the spot beam.

As noted, the amplitude of scan is not critical, the relative amplitude of the resulting cyclic flux variations at measuring stations on opposite sides of the boresight giving the required data.

By way of example, with ground stations at the 4 dB contour on the major and minor axes of the FIG. 1 pattern, and assuming further a 0.03° satellite circular scan motion, the peak to peak flux variation at the ground stations might be around 0.57 dB on the major axis and 1.38 dB on the minor axis. From OTS measurements, a level of 0.1 dB can easily be detected by eye from a chart recorder, and with a phase sensitive detector typically giving a 30 dB to 40 dB improvement in S/N depending upon the integration time the described technique might allow comparison of the flux amplitude variations due to the satellite scan to within a fraction of one percent.

In the given example a one percent error in the flux amplitude variation ratio corresponds to a pointing error of 0.0033° on the major axis and 0.0016° on the minor axis.

It will be realised that the measuring method and system described herein can be used to derive an indication of how the antenna pointing error varies over a period of time due for example to the daily variation of solar aspect and this indication can then be used to plan an attitude correction program which is then passed to the satellite to take out the variations. Thus, initially (or periodically if preferred) the method is used to determine the pointing error over one day say, and then there is calculated an appropriate daily program of correction commands.

Thereafter, the correction commands are transmitted up to the satellite in accordance with the daily program and no further measurements are made until, due to the seasonal variation in solar aspect, the program has become outdated whereupon a further day's measurements are taken and a new program is calculated.

Alternatively, of course, the correction program could be itself transmitted to and stored on the satellite so that this then automatically corrects itself without further interaction with the control station, until the program becomes outdated whereupon a new one is sent up.

We claim:

1. A method of determining a beam pointing direction of an antenna on board a spacecraft, said method comprising the steps of:
    transmitting an R.F. radiation beam to a ground from the antenna;
    varying periodically the beam pointing direction around an initial beam pointing direction to produce a repetitive displacement of a beam ground pattern and a corresponding oscillatory variation of a flux density at a plurality of off-boresight ground stations; and
    measuring said oscillatory variation at each of said ground stations and determining any errors in initial beam pointing direction about pitch and roll axes of said spacecraft based upon said oscillatory variations.

2. A method according to claim 1, wherein said oscillatory variations in flux density are measured relative to an average value of the flux density.

3. A method according to claim 1, wherein said oscillatory variations in flux density is measured at two off-boresight ground stations located generally to opposite sides of the beam ground pattern centre.

4. A method according to claim 1, wherein the beam pointing direction is varied to trace out a cone around the initial beam pointing direction and any errors in said initial beam pointing direction about the pitch and roll axes of the spacecraft are determined by measuring the resulting oscillatory variations in flux density at three or more off-boresight ground stations at locations distributed around the beam ground pattern centre.

5. A method according to claim 1, wherein the oscillatory variation in flux density is measured over a time period containing a plurality of wavelengths of the variation and using measuring equipment which is operable to discriminate the frequency of the variation.

6. A method of controlling the beam pointing direction of an antenna on board a spacecraft, comprising the steps of:
transmitting an R.F. radiation beam to a ground from the antenna;
varying periodically the beam pointing direction to produce a repetitive displacement of a beam ground pattern and a corresponding oscillatory variation of a flux density at an off-boresight ground station;
measuring said oscillatory variation at said ground station;
repeating said transmitting step, periodically varying step and measuring step a plurality of times so as to determine the diurnal pattern of the beam pointing direction error;
preparing using said determination, a program of spacecraft attitude correction commands for correcting said error; and
transmitting said commands to the spacecraft either at appropriate times throughout each day for substantially immediate execution or all at once for operation of the spacecraft in a store and execute mode.

7. A system for determining a beam pointing direction of an antenna on board a spacecraft, the system comprising:
a plurality of off-boresight ground stations;
control means for inducing a periodic variation of the beam pointing direction around an initial beam pointing direction and oscillatory variations in flux density at each of said plurality of ground stations; and
measuring means, at each of said off-boresight ground stations, for measuring said oscillatory variation and for determining any errors in initial beam pointing direction about pitch and roll axes of said spacecraft based upon said oscillatory variations.

8. A space communications system comprising:
a spacecraft having an antenna pointed towards a ground and means, controllable from the ground, for adjusting the spacecraft attitude;
a spacecraft operations control center able to communicate with the spacecraft and comprising equipment for inducing a change in attitude of the spacecraft to produce a repetitive displacement of a ground pattern of an antenna beam, said displacement including components in a North-South direction and an East-West direction on the ground;
at least three off-boresight ground stations spaced around a ground pattern center, each including means for measuring oscillatory variations in flux density received at a ground station;
communication link means coupled between said ground stations and said spacecraft operations control center for enabling flux density measurements made at the ground stations to be communicated to the control center, and for thereby enabling spacecraft attitude errors to be determined and appropriate correction commands to be transmitted to the spacecraft.

9. A system for controlling a boresight beam pointing direction of an antenna on a spacecraft, said antenna pointing generally in the direction of a ground station and transmitting an R.F. signal, said system comprising:
control means for inducing periodic variations in said beam pointing direction about said boresight beam pointing direction;
measuring means for measuring variations in flux density at at least one ground location apart from said ground station; and
correcting said pointing direction of said antenna based upon one of magnitude and phase of said variations in flux density received at said at least one location.

10. A method of controlling the beam pointing direction of an antenna on board a spacecraft, comprising the steps of:
transmitting an R.F. radiation beam to a ground from the antenna;
varying periodically the beam pointing direction to produce a repetitive displacement of a beam ground pattern and a corresponding oscillatory variation of a flux density at an off-boresight ground station;
measuring said oscillatory variation at said ground station, wherein the oscillatory variation in flux density is measured over a time period containing a plurality of wavelengths of the variation and using measuring equipment which is operable to discriminate the frequency of the variation.

11. A system for determining a beam pointing direction of an antenna on board a spacecraft, the system comprising:
control means for inducing variation of the beam pointing direction to produce a repetitive displacement of a ground pattern of an antenna beam by varying the beam pointing direction to trace out a cone around the initial beam pointing direction, and
measuring means at three or more off-boresight ground stations for measuring a resultant oscillatory variation in flux density received at said three or more ground stations.

* * * * *